United States Patent [19]
Dolev

[11] Patent Number: 5,261,427
[45] Date of Patent: Nov. 16, 1993

[54] COMB DEVICE FOR DESTRUCTION OF LICE AND LICE EGGS

[76] Inventor: Moshe Dolev, 22 Yehiam St., Ramat Hasharon, Israel

[21] Appl. No.: 924,464

[22] Filed: Aug. 4, 1992

[51] Int. Cl.$^5$ ............................ A01K 13/00; A45D 24/22
[52] U.S. Cl. ........................................... 132/200; 132/113; 119/156; 119/85; 34/98
[58] Field of Search ................... 119/83, 85, 156, 159; 132/200, 112, 113, 114, 115, 116, 272; 34/96, 97, 98

[56] References Cited

U.S. PATENT DOCUMENTS

| | | | |
|---|---|---|---|
| 724,178 | 3/1903 | Grant | 132/113 |
| 3,721,250 | 3/1973 | Walter | 132/112 |
| 4,114,022 | 9/1978 | Braulke | 34/97 |
| 4,376,441 | 3/1983 | Duncan | 132/112 |
| 4,676,260 | 6/1987 | Paulhus et al. | 132/112 |
| 4,692,594 | 9/1987 | Martin | 132/112 |

Primary Examiner—John G. Weiss
Attorney, Agent, or Firm—Edward Langer

[57] ABSTRACT

A lice comb device constructed as a portable, hand-held housing containing a blower heater, to heat and direct a stream of heated air toward a set of comb teeth attached to the housing. Each of the comb teeth is formed with a hollow cavity having an opening at its end. The heated air stream is directed via the comb tooth and exits at the opening, where it is deflected away from the scalp by a concave surface, so that it impinges on lice and lice eggs attached near the hair root. The temperature of the heated air destroys the lice and lice eggs. An exterior cooling jacket portion surrounding the interior housing portion provides a thermal barrier by conducting the flow of cooler air, allowing for safe handling of the comb housing. A chemical or natural agent may be placed in a receptacle in the housing, so as to introduce vapors in the heated air stream, with the vapors directed via the comb teeth to improve the lice-killing effects.

12 Claims, 3 Drawing Sheets

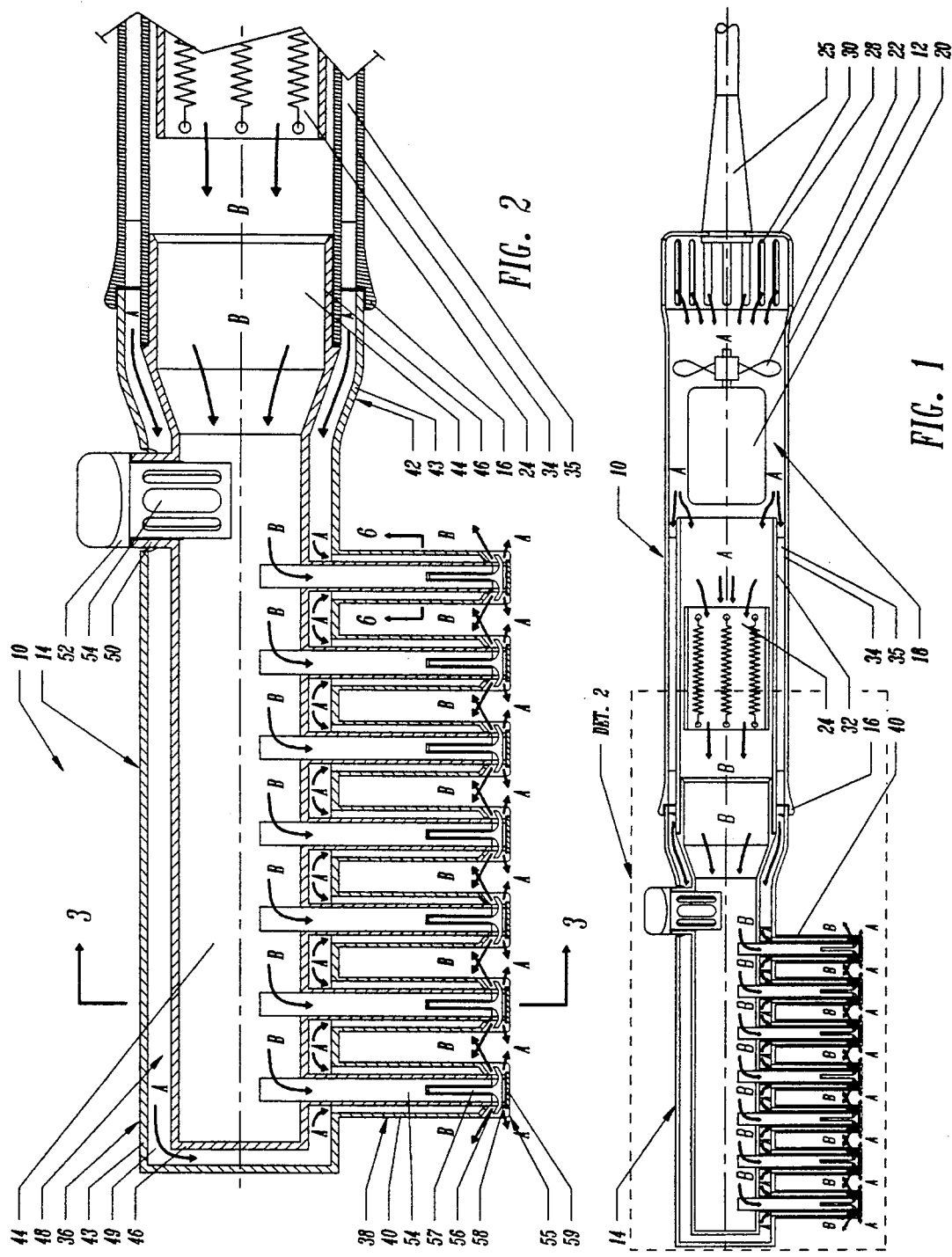

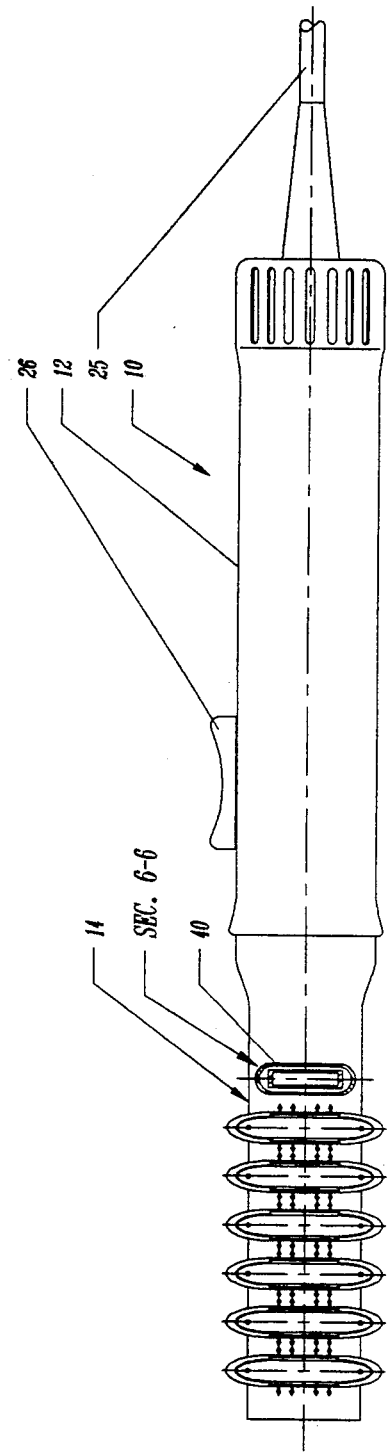
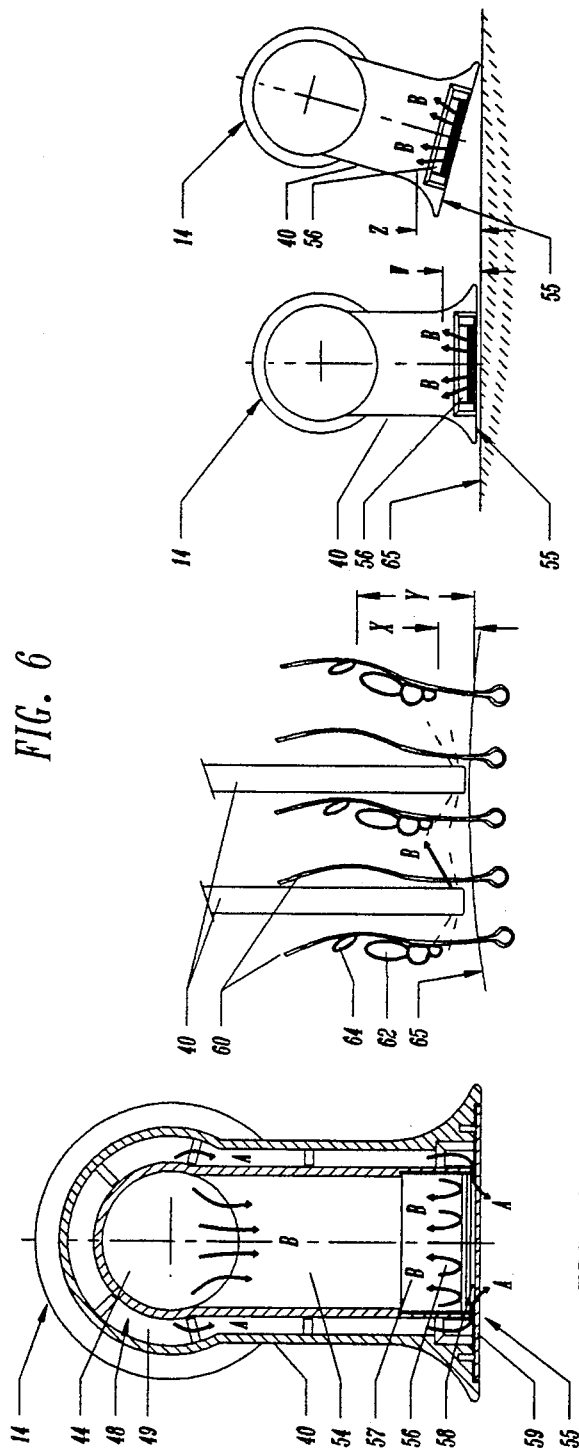
FIG. 6
FIG. 5
FIG. 4
FIG. 3

COMB DEVICE FOR DESTRUCTION OF LICE AND LICE EGGS

FIELD OF THE INVENTION

The present invention relates to personal hygiene accessories, and more particularly, to a comb for destroying parasites in mammals such as fleas, lice, lice eggs and the like by direct application of heat to the affected area.

BACKGROUND OF THE INVENTION

Head lice and other parasites are a continuing health problem in many parts of the world, and methods for treatment have not been totally successful in eradicating the spread of this persistent nuisance. Known methods of treatment include combs for removing lice which are caught between the comb teeth when they are passed through the hair, but this approach tends to be inadequate in removing lice eggs, which remain attached to the hair and are harder to remove by this method. An example of this type of comb is given in U.S. Pat. No. 4,671,303 to Saferstein et al.

Another widespread and well known method for treatment of lice infestation is the use of chemicals, and these are divided into categories of those which are effective against lice only, and those which are effective against lice and their eggs. A problem with this method is the tendency of lice to build up resistance to the active ingredients in these chemicals, reducing their effectiveness. Accumulation of these chemicals in the body is detrimental to health, especially for children.

Grooming combs and brushes for animals which are designed to spread insecticidal ingredients are disclosed in U.S. Pat. Nos. 4,958,596 to Belan, 4,902,154 to Valenza, 4,862,832 to Metzner, 4,685,423 and 4,604,971 to Baker et al.

U.S. Pat. No. 5,067,444 to Parker discloses an animal grooming comb with a hair dryer. A comb for capturing insects on an animal's coat is disclosed in U.S. Pat. No. 4,815,232 to Rawski.

Hair and styling dryers for human hair are described in U.S. Pat. Nos. 3,894,547 to Scivoletto, and 3,814,898 to Levine. Neither of these patents relates to treatment of lice in hair.

Natural ingredients have also been used to treat lice infestation, including the use of aromatic oils. These materials are not more effective than chemicals, and have the tendency to cause severe irritation of the scalp in babies and young children.

An electronic device marketed by Mepro-Epilady under the tradename "Robi-Combi" has been introduced as another method of treating lice infestation. An electrically charged metal comb is passed through the hair, and a charged capacitor is discharged through lice contacting adjacent comb teeth. This method is limited by the need for the comb to physically contact each lice, and by its ineffectiveness against lice eggs.

The behavior of lice in the scalp has been scientifically studied and it is known that the head lice feed on human blood via the soft skin of the scalp. The lice attach themselves to the hair near the root at a distance of about 3 mm from the scalp, their heads facing downward toward the scalp. Every several hours the lice crawl toward the scalp skin, to suck blood, and when satisfied the lice return to the resting position, in which they remain most of time. In this position, the lice lay their eggs and attach them to the hair at a distance of about 6 mm from the scalp, and this distance grows about 1 mm per day with normal hair growth.

Lice and lice eggs are extremely sensitive to temperature; exposure to a temperature of 55 degrees C for 5 minutes kills them, and at 80 degrees C, exposure of only a few seconds kills them. While such high temperature exposure can be effective, however, the main problem with the application of high temperatures to the scalp is the risk of burning the scalp skin.

Therefore, it would be desirable to provide a lice comb which makes use of known temperature exposure characteristics for destruction of head lice and lice eggs, without presenting a danger of harm or irritation to the scalp.

It would also be desirable to provide a method of lice treatment using temperature, which is convenient and effective.

SUMMARY OF THE INVENTION

Accordingly, it is a principal object of the present invention to overcome the above-mentioned disadvantages of prior art lice treatment methods and provide a lice comb for destruction of lice and lice eggs, by high temperature exposure.

In accordance with a preferred embodiment of the present invention, there is provided a lice comb device for destruction of lice and lice eggs comprising:

a source of heated air; and means for directing the flow of said heated air in the proximity of the scalp, and for deflecting said heated air away from the scalp, such that on passing said flow direction means through hair infested with lice, said deflected heated air impinges on the lice and their eggs to destroy them without injuring the scalp.

In the preferred embodiment, the lice comb is constructed as a portable, hand-held housing containing a blower heater, to heat and direct a stream of heated air toward a set of comb teeth attached to the housing. Each of the comb teeth is formed with a hollow cavity having an opening at its end. The heated air stream is directed via the comb tooth and exits between adjacent comb teeth at the opening, where it is deflected by a concave surface away from the scalp, so that it impinges on lice attached near the hair root. The temperature of the heated air destroys the lice and lice eggs.

The housing is constructed with a heat diffuser portion which provides passages for the flow of heated air, and with an exterior cooling jacket portion surrounding the diffuser portion and providing insulation by conducting the flow of cooler air. This construction allows for safe handling of the comb housing.

The set of comb teeth are provided in a comb attachment to the housing, and each tooth is shaped with a flared tip at its bottom end, which assists the combing effort, and the tooth width insures that the heated air will not be directed toward the scalp even if the comb is rotated while passing through the hair.

A feature of the invention is the provision of a receptacle sealed in an aperture in the comb housing, in which a chemical or natural agent may be placed to release vapors. The vapors are effective against lice when carried by the heated air stream, and directed via the comb teeth to the effected area.

The inventive lice comb has many advantages over other devices and methods of treating lice infestation, and features simple construction, allowing for cost-effective production, and ease of use and maintenance.

Other features and advantages of the invention will become apparent from the drawings and the description contained hereinbelow.

BRIEF DESCRIPTION OF THE DRAWINGS

For a better understanding of the invention with regard to the embodiments thereof, reference is made to the accompanying drawings, in which like numerals designate corresponding elements or sections throughout, and in which:

FIG. 1 is a longitudinal cross-section of a preferred embodiment of a lice comb device constructed and operated in accordance with the present invention;

FIG. 2 is an enlarged partial cross-section of the lice comb of FIG. 1, providing details of the comb attachment portion;

FIG. 3 is a transverse cross-section of the lice comb, taken along section lines 3—3 of FIG. 2;

FIG. 4 is an illustration of the lice comb passing through lice-infested hair;

FIG. 5 is a front view of the lice comb showing it with the comb teeth held directly over the scalp and tilted thereto;

FIG. 6 is a bottom view of the lice comb shown from under the comb attachment portion.

DETAILED DESCRIPTION OF THE PREFERRED EMBODIMENTS

Figure 7:
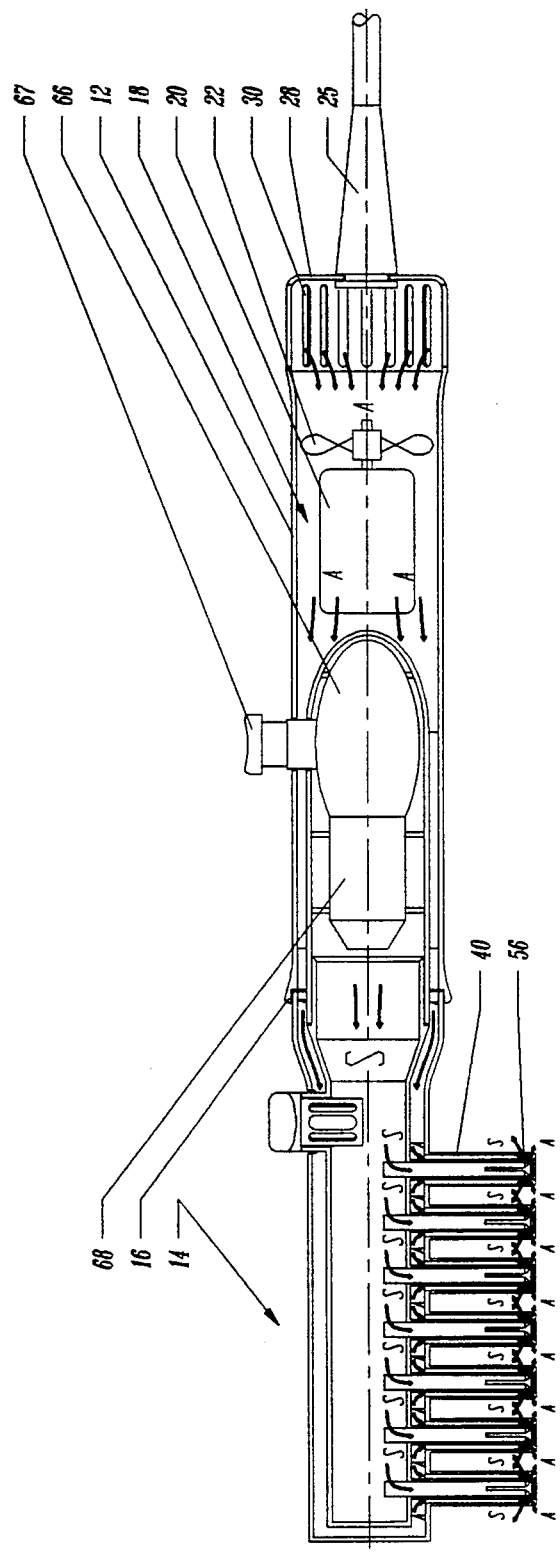
FIG. 7 is a longitudinal cross-section of an alternative embodiment of the lice comb, using steam vapors.

Referring now to FIGS. 1-2, there are shown longitudinal cross-sections of a preferred embodiment of a lice comb device 10 constructed and operated in accordance with the present invention. Comb 10 comprises a cylindrical housing 12 and a comb portion 14 attached to housing 12 by a push-fit onto an end 16 of housing 12. Housing 12 contains a blower 18 comprising miniature electric motor 20 and fan 22, and a heater unit 24, all powered by conventional electric cord 25, via a switch assembly 26 mounted in housing 12 (FIG. 6). Heater unit 24 includes a thermostat (not shown) to control its operation. The electrical wiring (not shown) is based on standard electrical designs.

Housing 12 is formed at an end 28 thereof with openings 30. Heater unit 24 is seated in an inner cylindrical sleeve 32 which, together with the walls 34 of housing 12, define an annular air passage 35 extending toward open end 16 of housing 12.

As best illustrated in the enlarged detailed view of FIG. 2, comb portion 14 comprises cylindrical upper sections 36, integrally formed with a lower section 38 comprising a set of comb teeth 40. Upper section 36 has an end portion 42, with an outer wall 43 having a diameter designed to match the inner diameter of end 16, enabling a push-fit. A heat diffuser 44 is defined by inner wall 46 of end portion 42.

The heat diffuser 44 extends through upper section 36 and lower section 38 of comb portion 14, an is surrounded by a cooling jacket 48 defined by outer wall 43. Between outer wall 43 and inner wall 46, there are defined air passageways 49 which are in communication with annular air passage 35 of housing 12. Air passageways 49 of cooling jacket 48 provide a thermal barrier between heat diffuser 44 and external ambient air. Cooling jacket 48 may be constructed of split sections joined together (not shown), enabling assembly over inner walls 46 of heat diffuser 44.

An aperture 50 formed in upper section 36 has seated therein a receptacle 52, which has openings 54 formed therein so as to be in communication with heat diffuser 44. A chemical or natural agent may be placed in receptacle 52 to release vapors. For example, an absorbent pad or sponge (not shown) soaked with lice-killing chemicals or natural agents may be placed in receptacle 52, to evaporate the chemicals into the heated air stream. A solid material may also be used in this fashion.

In lower section 38 of comb portion 14, each tooth 40 of the set of comb teeth is formed with a hollow cavity 54, which is in communication with heat diffuser 44. At its bottom end 55, tooth 40 is formed with openings 56 on both sides thereof, allowing heated air in hollow cavity 54 to exit. Seated in each opening 56 is a deflector 57, which is shaped with a concave surface facing upwardly. A space 58 is defined between deflector 57 and a strip 59 attached to tooth 40, completing the thermal barrier provided by cooling jacket 48.

FIG. 3 illustrates a transverse cross-sectional view of comb 10, taken along section lines 3—3 of FIG. 2. In this view, further construction details of tooth 40 are revealed, including the flared shape of the width of each tooth 40 at its bottom end 55. The flared shape assists comb 14 to part the hair as it passes through it, by providing a wedge. Also shown in FIG. 3 are heat diffuser 44, hollow cavity 54, cooling jacket 48, and deflector 57.

Referring now to FIGS. 1-4, in operation, when blower 18 operates, ambient air is drawn through openings 30 and splits into flow via sleeve 32 and air passage 35, as shown by arrows A. The air flow into sleeve 32 is forced through heater unit 24, wherein it is heated to a sufficiently high temperature to be immediately effective against lice and their eggs. The temperature of the air in air passage 35 remains in the ambient range or slightly higher, providing a thermal barrier for safe handling of housing 12 and comb portion 14. The ambient air flow continues via end 16 of housing 12 into comb portion 14, and through air passageways 49.

Alternatively, cooling jacket 48 may be sealed with trapped air in air passageways 49, to provide the thermal barrier.

The heated air stream is force forward by blower 18 in the direction of arrows B, and through heat diffuser unit 44, and continues to flow into comb portion 14, and through comb teeth 40 via hollow cavity 54. At the bottom end 55 of each comb tooth 40, the heated air stream is deflected away from the scalp by deflector 57 as it exits comb tooth 40 via openings 56. As shown in the illustration of FIG. 4, hand-held housing 12 may be manipulated so that comb portion 14 is passed through lice-infested hair. In this way, comb teeth 40 ar placed in proximity to hair strands 60, to which lice 62 and lice eggs 64 are attached, respectively, at distances X and Y from scalp 65 (typically 3 mm and 6 mm as stated in the background). The heated air stream exiting from openings 56 is deflected so as to directly impinge on the lice, killing them by high temperature. As stated, use of chemical or natural agents in receptacle 52 may improve results, by introducing vapors in the heated air stream.

By virtue of its design, deflectors 57 prevent heated air from coming into contact with scalp 65, while the cooler ambient air (arrows A) exits via space 58 under deflector 57. The cooler air does not irritate the scalp 65, though it may come into contact with it.

As shown in FIG. 5, even if comb portion 14 is incidentally rotated with respect to the scalp 65, this does not present any danger of scalp irritation, since the heated air (at distance W) is moved farther away from scalp 65 (to distance Z) as it exits openings 56 due to the tooth 40 bottom end 55 width.

In FIG. 6, a bottom view of the lice comb is shown from under comb portion 14, revealing further construction details, with a sectional view of tooth 40.

FIG. 7 is a longitudinal cross-section of an alternative embodiment of the lice comb, using steam vapors. In this design, a refillable container 66 of water is provided in housing 12, and a depressable button 67 is arranged to release water spray into a steam generator unit 68, to instantly vaporize the water droplets so as to form steam vapors (S). The steam vapors flow through comb portion 14 as in the previous embodiment, to reach openings 56.

In summary, the inventive lice comb has many advantages over other devices and methods of treating lice infestation, and features simple construction, allowing for cost-effective production, and ease of use and maintenance.

Having described the invention with regard to certain specific embodiments thereof, it is to be understood that the description is not meant as a limitation, since further modifications may now become apparent to those skilled in the art, and it is intended to cover such modifications as fall within the scope of the appended claims.

I claim:

1. A lice comb device for destruction of lice and lice eggs comprising:

a source of heated air stream; and means for directing the flow of said heated air stream in the proximity of the scalp, and for deflecting said heated air away from the scalp, such that on passing said flow direction means through hair infested with lice, said deflected heated air impinges on the lice and their eggs to destroy them without injuring the scalp, wherein said flow direction means comprises a housing and a set of comb teeth extending from said housing, each comb tooth being formed with a hollow cavity and an opening at its end cooperating with a deflector means, said heated air stream flowing through each said comb tooth whereat it exits via said opening and is deflected away from the scalp, and wherein said housing is constructed with a cooling jacket comprising air passageways surrounding said heated air stream source within which cool ambient air provides a thermal barrier in said housing.

2. The device of claim 1 wherein said flow direction means comprises a housing and a set of comb teeth extending from said housing, each comb tooth formed with a hollow cavity and an opening at its end cooperating with a deflector means, said heated air stream flowing through each said comb tooth whereat it exits via said opening and is deflected away from the scalp.

3. The device of claim 2 wherein each said comb tooth has a flared shape at its bottom end, to assist in combing the hair.

4. The device of claim 1 wherein said heated air stream source comprises means for heating water and generating steam vapors.

5. The device of claim 1 wherein said heated air stream source comprises a heater unit and a fan for blowing said heated air.

6. The device of claim 1 wherein said cool ambient air flows in the air passageways.

7. The device of claim 1 wherein said cool ambient air is trapped in the air passageways.

8. The device of claim 2 wherein said housing has an aperture formed therein for a receptacle holding an active ingredient for killing lice, said receptacle communicating with said heated air steam, such that vapors of said active ingredient flow in said heated air stream.

9. The device of claim 2 wherein each of said comb teeth has a wide bottom end to insure that upon incidental rotation of said housing, said openings are lifted away from the scalp to prevent injury.

10. A method of destroying lice and lice eggs comprising the steps of:

providing a flow of heated air proximate the scalp; and deflecting said heated air flow away from the scalp, such that on passing said heated air flow through hair infested with lice, said deflected heated air impinges on the lice and their eggs to destroy them without injuring the scalp, further comprising the step of providing cool ambient air in air passageways surrounding said heated air flow to provide a thermal barrier.

11. The method of claim 11 wherein said flow of heated air includes introduction of active ingredient vapors in said heated air flow.

12. The method of destroying lice and lice eggs comprising the steps of:

providing a flow of steam vapors proximate the scalp; and deflecting said steam vapor flow away from the scalp, such that on passing said steam vapor flow through hair infested with lice, said deflected steam vapors impinge on the lice and their eggs to destroy them without injuring the scalp.

* * * * *